(12) United States Patent
Kaneko et al.

(10) Patent No.: US 8,321,702 B2
(45) Date of Patent: Nov. 27, 2012

(54) INFORMATION PROCESSING APPARATUS AND POWER-SAVING SETTING METHOD

(75) Inventors: Yoshihiro Kaneko, Fussa (JP); Hideaki Andou, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 394 days.

(21) Appl. No.: 12/635,505

(22) Filed: Dec. 10, 2009

(65) Prior Publication Data
US 2010/0241888 A1 Sep. 23, 2010

(30) Foreign Application Priority Data
Mar. 17, 2009 (JP) .................................. 2009-064982

(51) Int. Cl.
*G06F 1/32* (2006.01)
(52) U.S. Cl. ........ 713/320; 713/321; 713/322; 713/323; 713/324
(58) Field of Classification Search ............... 713/320, 713/321, 322, 323, 324
See application file for complete search history.

(56) References Cited

U.S. PATENT DOCUMENTS
2001/0044907 A1 11/2001 Yoshimoto et al.
2006/0087981 A1* 4/2006 Sengupta et al. ............ 370/252
2006/0223495 A1* 10/2006 Cassett et al. ................ 455/405
2010/0106994 A1* 4/2010 Challener et al. ............ 713/330
2011/0125482 A1* 5/2011 Michelson ....................... 703/21

FOREIGN PATENT DOCUMENTS
| JP | 10-143283 | 5/1998 |
| JP | 2001-331243 | 11/2001 |
| JP | 2004-062405 | 2/2004 |
| JP | 2006-187987 | 7/2006 |
| JP | 2007-027936 | 2/2007 |
| JP | 2007-179242 | 7/2007 |
| JP | 2008-186089 | 8/2008 |
| JP | 2008-197812 | 8/2008 |

OTHER PUBLICATIONS

Japanese Patent Application No. 2009-064982, Notice of Reasons for Rejection, mailed Feb. 23, 2010, (with English Translation).
Japanese Patent Application No. 2009-064982, Decision of Rejection, mailed Jun. 29, 2010, (with English Translation).

* cited by examiner

*Primary Examiner* — Vincent Tran
(74) *Attorney, Agent, or Firm* — Blakely, Sokoloff, Taylor & Zafman LLP (57) ABSTRACT

According to one embodiment, an information processing apparatus having a power-saving function includes a monitoring module and a power-saving setting presenting module. The monitoring module monitors a usage pattern of the information processing apparatus, and stores log information indicative of the usage pattern in a storage device. The power-saving setting presenting module determines recommended values of power-saving parameters for specifying content of the power-saving function, based on the stored log information, and to display the determined recommended values.

8 Claims, 6 Drawing Sheets

| Monitoring items |
|---|
| Usage rate of CPU |
| Process for CPU (process name, usage rate, operating time, etc.) |
| Operating time of fan |
| Memory usage pattern |
| Power supply amount through AC adaptor |
| Battery temperature |
| Charge / discharge capacity of battery |
| Display brightness |
| Turn-on time of backlight |
| Measurement value by illuminance sensor |
| Number of times of operation of power switch |
| Number of times of operation of function key |
| Number of times of access to HDD |
| Number of times of operation of sound volume |
| Number of times of operation of wireless communication switch |
| Usage pattern of wired LAN |
| Usage pattern of wireless LAN |
| Usage pattern of Bluetooth |
| Number of times of connection to USB port |
| Number of times of read / write of ODD |
| Number of times of insertion in SD card slot |

| | | | History of use (2009.1.1~2009.1.31) |
|---|---|---|---|
| | HDD off timer<br>Time when power supply to hard disk is automatically turned off is set | 5 minutes ▼ | 11 |
| | Monitor off timer<br>Time when power supply to liquid crystal monitor is automatically turned off is set | 5 minutes ▼ | 13 |
| | System sleep<br>Power consumption is suppressed by setting in sleep state | 5 minutes ▼ | 7 |
| | Hibernation<br>Power supply is completely stopped by setting in hibernate state | 5 minutes ▼ | 2 |
| | ODD power supply<br>Power consumption is suppressed by turning off power to DVD drive | ○ ON  ⊙ OFF | 0 |
| | 1394 power supply<br>Power consumption is suppressed by turning off power to 1394 device | ○ ON  ⊙ OFF | 3 |
| | SD power supply<br>Power consumption is suppressed by turning off power to SD drive | ○ ON  ⊙ OFF | 15 |

OK | Cancel | Apply

F I G. 7

INFORMATION PROCESSING APPARATUS AND POWER-SAVING SETTING METHOD

CROSS-REFERENCE TO RELATED APPLICATIONS

This application is based upon and claims the benefit of priority from Japanese Patent Application No. 2009-064982, filed Mar. 17, 2009, the entire contents of which are incorporated herein by reference.

BACKGROUND

1. Field

One embodiment of the invention relates to an information processing apparatus having a power-saving function and a power-saving setting method applied to this apparatus.

2. Description of the Related Art

In recent years, various types of personal computers having power-saving functions have been developed. This type of personal computer is provided with, for example, a utility program which enables a user to set parameters for power-saving. Using the utility program, the user can set, for example, a time until the personal computer is set in a hibernate state. If the set time has passed without an operation by the user, the personal computer is set in the hibernate state, and power consumption is reduced.

Jpn. Pat. Appln. KOKAI Publication No. 2006-187987 discloses a power control system wherein the respective parameters of a power-saving mode can be set in units of a time zone by referring to the history of past power consumption, so that the power consumption of a multi-function printer (MFP) may become closer to a target value.

In the power control system of KOKAI Publication No. 2006-187987, the respective parameters of the power-saving mode are set in order to make the power consumption of the MFP closer to the target value. Thus, depending on a power-saving mode which is set, the effect of power-saving is high, but such a problem may arise that a long time is needed to return to the normal mode from the power-saving mode, leading to degradation in convenience.

Therefore, it is necessary to realize a new function for providing a power-saving function suited to the usage pattern of a computer by a user, and having a high power-saving effect.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, there is provided an information processing apparatus comprising a power-saving function, the apparatus comprising: a monitoring module configured to monitor a usage pattern of the information processing apparatus, and to store log information indicative of the usage pattern in a storage device; and a power-saving setting presenting module configured to determine recommended values of power-saving parameters for specifying content of the power-saving function, based on the stored log information, and to display the determined recommended values.

The structure of an information processing apparatus according to an embodiment of the present invention will now be described with reference to FIGS. 1 and 2. The information processing apparatus of this embodiment is realized, for example, as a notebook-type portable personal computer 10.

Figure 1:
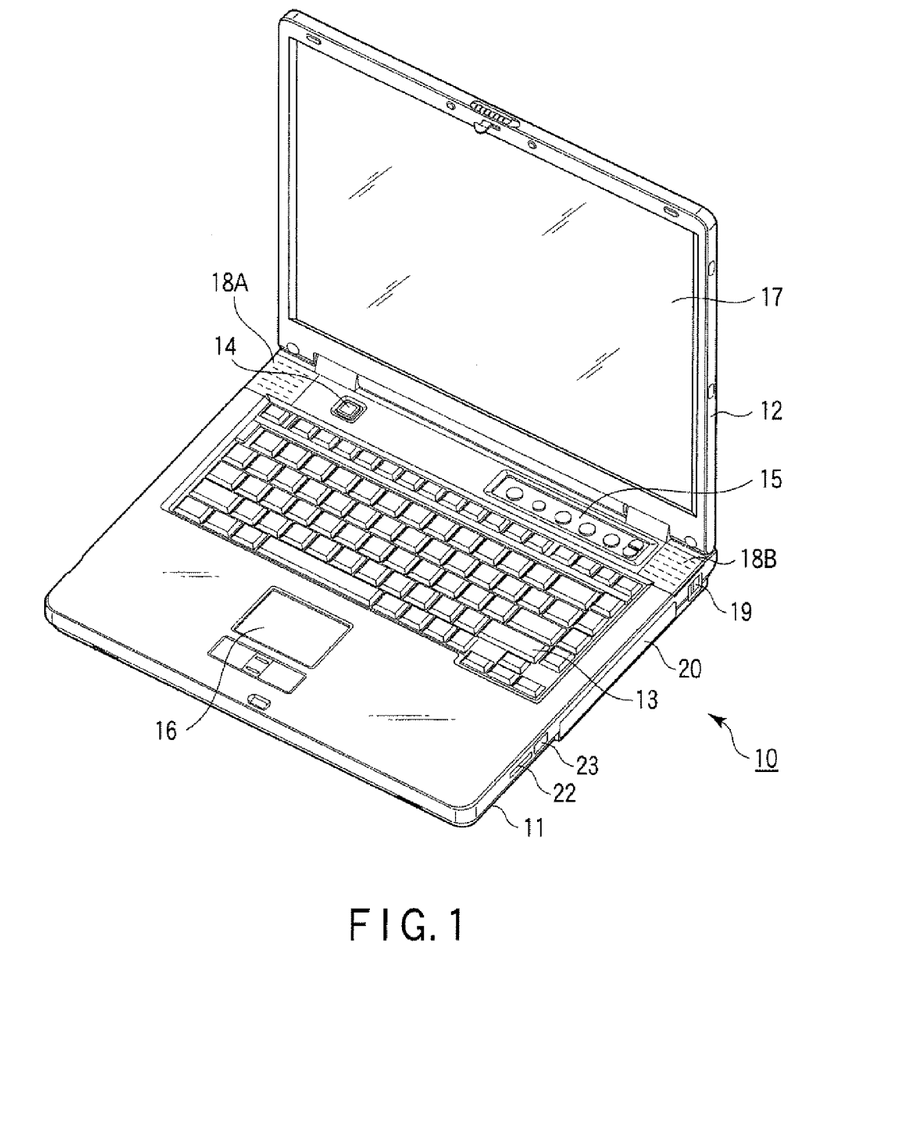
FIG. 1 is an exemplary perspective view showing an example of the external appearance of an information processing apparatus according to an embodiment of the present invention.

FIG. 1 is a perspective view showing the personal computer 10 in the state in which a display unit thereof is opened. The personal computer 10 includes a computer main body 11 and a display unit 12. A display device which includes a thin-film transistor liquid crystal display (TFT-LCD) 17 is built in the display unit 12.

The display unit 12 is attached to the computer main body 11 to be pivotal between an open position where the upper face of the computer main body 11 is exposed and a close position where the display unit 12 covers the upper face of the computer main body 11. The computer main body 11 has a thin box-shaped housing. A keyboard 13, a power button 14 for powering on/off the computer 10, an input operation panel 15, a touch pad 16, and speakers 18A and 18B are arranged on the upper face of the housing of the computer main body 11. A wireless communication switch 19, an optical disc drive (ODD) 20, an SD card slot 22, and a USB port 23 are provided, for example, on the right side face of the computer main body 11. The input operation panel 15 is an input device for inputting an event corresponding to a pressed button. The input operation panel 15 includes buttons for activating functions.

Figure 2:
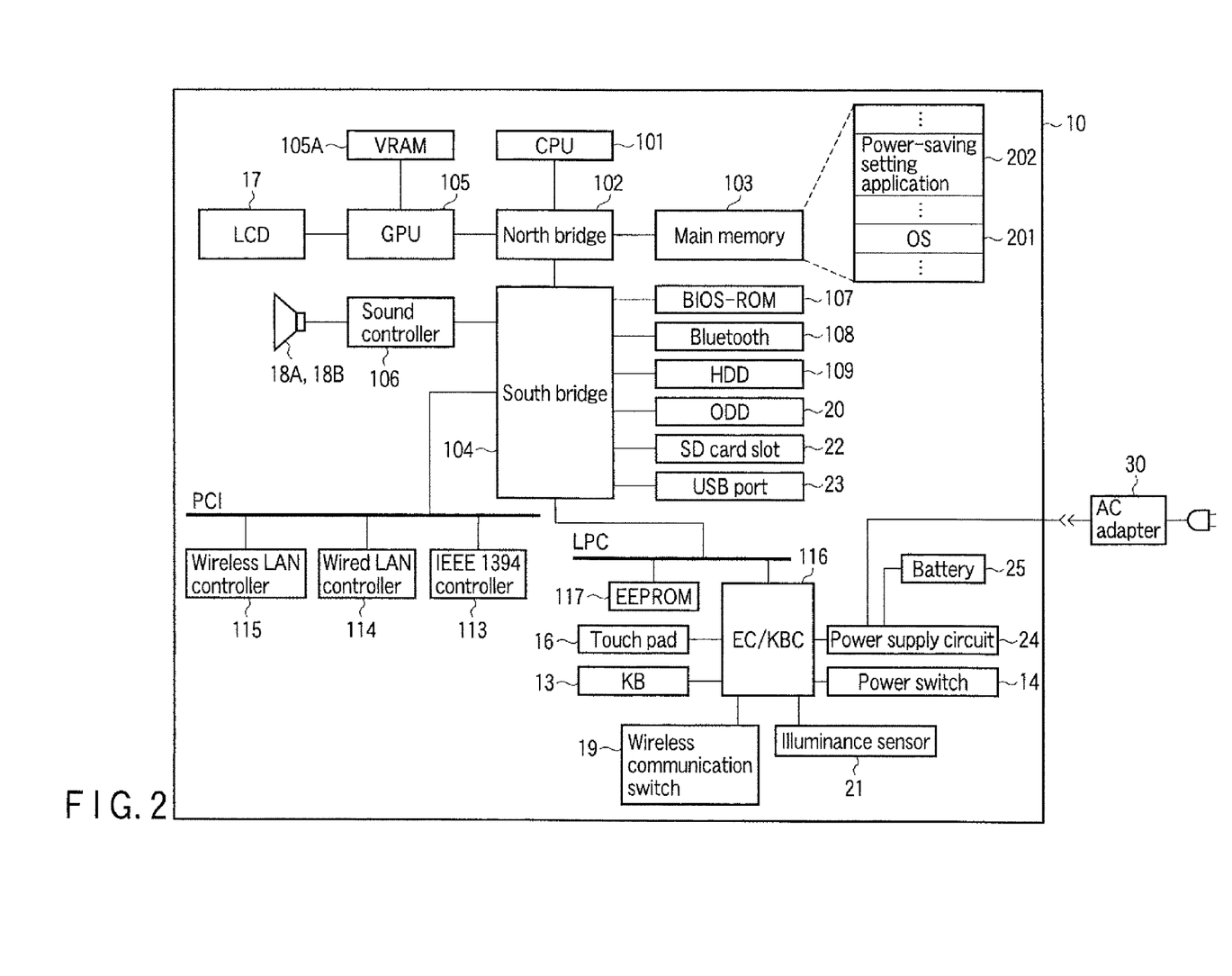
FIG. 2 is an exemplary block diagram showing the structure of the information processing apparatus according to the embodiment.

Referring to FIG. 2, the system configuration of the computer 10 is described.

As shown in FIG. 2, the computer 10 includes a CPU 101, a north bridge 102, a main memory 103, a south bridge 104, a graphics processing unit (GPU) 105, a video memory (VRAM) 105A, a sound controller 106, a BIOS-ROM 107, a Bluetooth™ module 108a, a hard disk drive (HDD) 109, an ODD 20, an SD card slot 22, a USB port 23, an IEEE 1394 controller 113, a wired LAN controller 114, a wireless LAN controller 115, an embedded controller/keyboard controller IC (EC/KBC) 116, an EEPROM 117, a keyboard (KB) 13, a power switch 14, a touch pad 16, a wireless communication switch 19, an illuminance sensor 21, a power supply circuit 24, a battery 25, and an AC adapter 30.

The CPU 101 is a processor for controlling the operation of the computer 10. The CPU 101 executes an operating system (OS) 201 loaded from the hard disk drive (HOD) 109 into the main memory 103. In addition, the CPU 101 executes various application programs, such as a power-saving setting application program 202. The power-saving setting application program 202 is software for setting a power-saving function of the computer 10. The power-saving setting application program 202 executes a monitoring process for collecting information indicative of the usage pattern of the computer 10 as log information, and a power-saving setting presenting process for analyzing the log information, determining recommended values of power-saving parameters for specifying the content of the power-saving function, and displaying the determined recommended values. In addition, the CPU 101 executes a basic input/output system (BIOS) stored in the BIOS-ROM 107. The BIOS is a program for hardware control.

The north bridge 102 is a bridge device which connects a local bus of the CPU 101 and the south bridge 104. The north bridge 102 includes a memory controller which access-controls the main memory 103. The north bridge 102 also has a function of executing communication with the GPU 105 via, e.g. a PCI EXPRESS serial bus.

The GPU 105 is a display controller which controls the LCD 17 used as a display monitor of the computer 10. The GPU 105 generates a video signal and sends the video signal to the LCD 17.

The south bridge 104 controls devices on a Low Pin Count (LPC) bus, and devices on a Peripheral Component Interconnect (PCI) bus. The south bridge 104 includes an Integrated Drive Electronics (IDE) controller for controlling the HDD 109 and ODD 20. The south bridge 104 also has a function of executing communication with the Bluetooth module 108 and sound controller 106. The sound controller 106 is a sound source device and outputs audio data to be played back to the speakers 18A and 18B. Furthermore, the south bridge 104 includes an SD card controller for controlling a card device (SD card) detachably loaded in the SD card slot 22, and a USB controller which controls a USB device detachably connected to the USB port 23.

The IEEE 1394 controller 113, wired LAN controller 114 and wireless LAN controller 115 are connected to the PCI bus.

The IEEE 1394 controller 113 executes communication with an external device via an IEEE 1394 serial bus. The wired LAN controller 114 is a communication device which executes communication of, e.g. the IEEE 802.3 standard. The wireless LAN controller 115 is a wireless communication device which executes communication of, e.g. the IEEE 802.11 standard.

The embedded controller/keyboard controller IC (EC/KBC) 116 is a 1-chip microcomputer in which an embedded controller for power management and a keyboard controller for controlling the keyboard (KB) 13 and touch pad 16 are integrated.

The embedded controller/keyboard controller IC (EC/KBC) 116 has a function of cooperating with the power supply circuit 24, thereby powering on/off the computer 10 in response to the user's operation of the power switch 14. The power supply circuit 24 uses power supplied from the outside via the AC adapter 30 or power supplied from the battery 25 and supplies power to the respective components of the computer 10. In other words, the computer 10 is driven by power supplied from an external power supply such as an AC commercial power supply, or by power supplied from the battery 25. The AC adapter 30 may be provided within the computer 10. In addition, the power supply circuit 24 has a function of determining whether power is supplied from the external power supply to the computer 10 via the AC adapter 30. If power is supplied from the external power supply to the computer 10, the power supply circuit 24 supplies power to the respective components of the computer 10 by using the power supplied from the external power supply. On the other hand, if no power is supplied from the external power supply to the computer 10, the power supply circuit 24 supplies power to the respective components of the computer 10 by using the power supplied from the battery 25. Besides, the power supply circuit 24 stores information relating to a remaining power amount of the battery 25.

The embedded controller/keyboard controller IC (EC/KBC) 116 has a function of turning on/off the Bluetooth module 108 and wireless LAN controller 115, in response to the operation of the wireless communication switch 19. If the wireless communication switch 19 is set in an OFF position, both the Bluetooth module 108 and wireless LAN controller 115 are set in an OFF state (power-off state).

In addition, the embedded controller/keyboard controller IC (EC/KBC) 116 has a function of controlling the illuminance sensor 21. The illuminance sensor 21 is a sensor which measures the illuminance of the environment in which the computer 10 is used.

Figure 3:
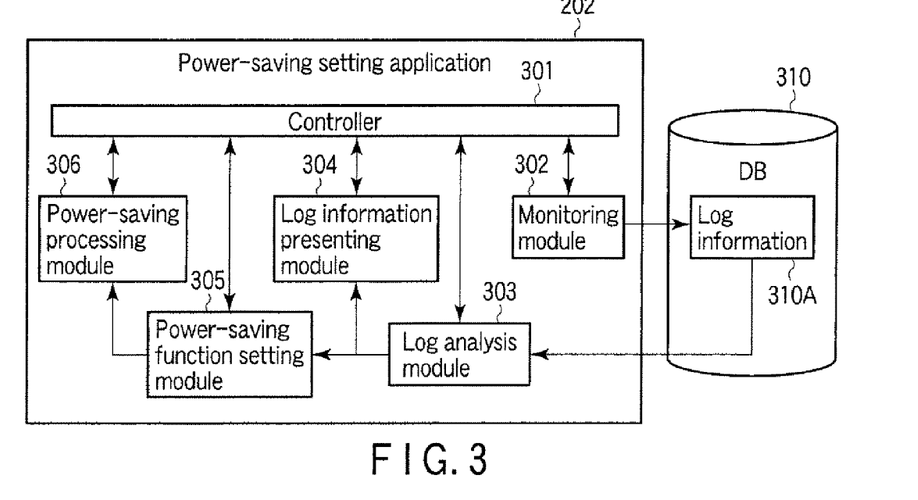
FIG. 3 is an exemplary block diagram showing the functional structure of a power-saving setting application used in the information processing apparatus according to the embodiment.

FIG. 3 is a block diagram showing the functional structure of the power-saving setting application 202.

The power-saving setting application 202 comprises a controller 301, a monitoring module 302, a log analysis module 303, a log information presenting module 304, a power-saving function setting module 305, and a power-saving processing module 306. The power-saving setting application 202 executes a process of reading/writing data from/in a database 310. The database 310 is a storage device, such as the HDD 109, which stores log information 310A.

The controller 301 controls the operations of the respective components of the power-saving setting application 202.

The monitoring module 302 monitors the usage pattern of each component in the computer 10, and collects information indicative of the usage rate (the frequency of use) of each component. The information indicative of the usage rate of each component includes values indicative of the number of times of use of each component, the time of use of each component, and the amount of use of each component. The monitoring module 302 collects the information indicative of the usage rate of each component, in every predetermined time period or at a time when an event has occurred in each component. The monitoring module 302 stores the collected information together with information indicative of the date/time of collection of information as log information 310A into the database 310 at proper times. Thus, the log information 310A which indicates the usage pattern of the computer 10 over a long time period is stored in the database 310.

Figure 4:
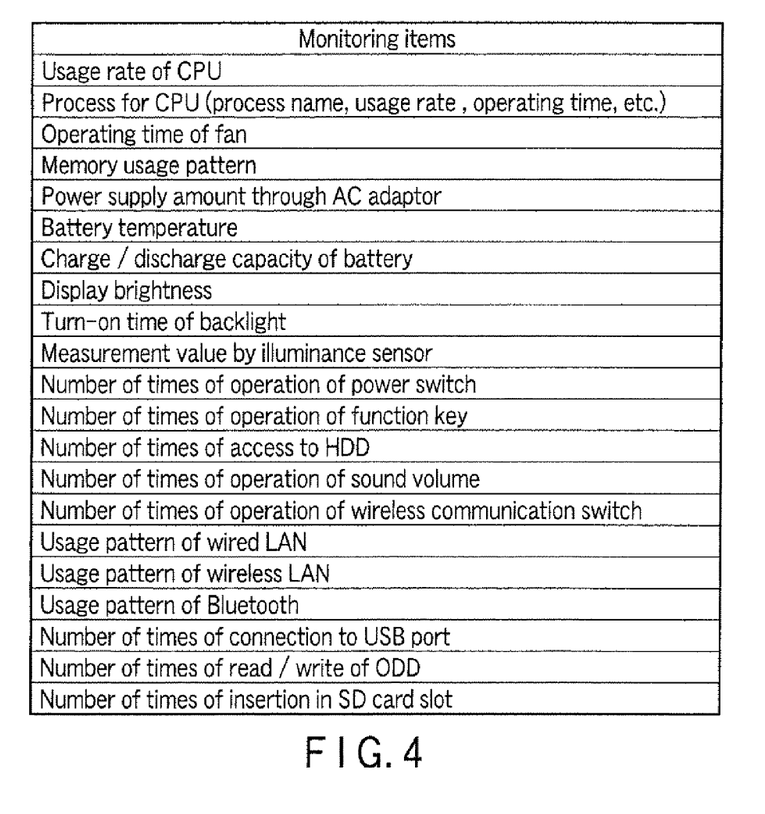
FIG. 4 shows examples of items in log information indicative of the usage pattern, which is collected by the power-saving setting application shown in FIG. 3.

FIG. 4 shows examples of monitoring items indicative of the usage pattern of the respective components in the computer 10, which are monitored by the monitoring module 302. The examples of monitoring items are the usage rate of the CPU 101; the information relating to a process using the CPU 101; the operating time of a fan; the amount of use of the memory 103; the power supply amount by the AC adaptor 30; the temperature of the battery 25; the charge/discharge capacity of the battery 25; the brightness of the LCD 17; the lighting time of backlight; the measurement value by the illuminance sensor 21; the number of times of operation of the power switch 14; the number of times of operation of function keys;

the number of times of access to the HDD 109; the number of times of operation of a sound volume; the number of times of ON/OFF operation of the wireless communication switch 19; the usage pattern of wired LAN; the usage pattern of wireless LAN; the usage pattern of the Bluetooth module 108; the number of times of connection to the USB port 23; the number of times of read/write of the ODD 20; and the number of times of insertion in the SD card slot 22. The information relating to a process using the CPU 101 is, for example, the information about the usage rate of the CPU, the number of times of use of the CPU and the time of use of the CPU collected by monitoring processes with a high load on the CPU 101, such as a game with a high processing amount, CAD software and video processing software.

The monitoring module 302 monitors and collects the values measured in the associated components, such as the CPU 101 and memory 103 as the usage rate of the CPU 101 and the amount of use of the memory 103. In addition, the monitoring module 302 monitors commands issued to the associated components, such as the HOD 109 and USB port 23, and commands issued from the associated components as the number of times of access to the HDD 109 and the number of times of connection to the USB port 23, and counts the number of commands. If the commands issued to the associated components in the computer 10 and the commands issued from the associated components are monitored, the monitoring module 302 counts the number of all commands issued or the number of specific commands issued, such as read commands and write commands, and uses the counted numbers as the number of times of use (e.g. the number of times of access, the number of times of operation and the number of times of connection). For example, when monitoring the ODD 20, the monitoring module 302 counts the number of read commands and write commands issued to the ODD 20.

The log analysis module 303 reads out the log information 310A from the database 310 and analyzes the read-out log information 310A. The log analysis module 303 calculates statistic information in a predetermined period of the log information 310A. The log analysis module 303 outputs the calculated statistic information of the log information 310A to the log information presenting module 304 and the power-saving function setting module 305.

The log information presenting module 304 displays the statistic information of the log information 310A calculated by the log analysis module 303, in the form of a table or a graph on the LCD 17. The user can understand the usage pattern of each component in the computer 10 based on the displayed statistic information of the log information 310A.

The power-saving function setting module 305 determines recommended values of power-saving parameters set for the respective components in the computer 10, in every predetermined time period based on the statistic information of the log information 310A calculated by the log analysis module 303. The power-saving parameters are parameters which specify the content of the power-saving function. The power-saving parameters are parameters applied to predetermined devices in the computer 10. In short, the power-saving parameters indicate the content of the power-saving function applied to each device.

Specifically, the power-saving parameters include parameter values which designate the power consumption of each component in the computer 10; the condition of heat control of each component in the computer 10; the processing speed of the CPU 101; the amount of use of the main memory 103, the luminance the LCD 17; the lighting time of the backlight; the time until power-off of the LCD 17; the time until power-off of the HDD 109; the time until power-off of the ODD 20; the time until setting the system in a sleep mode; and the time until setting the computer 10 in a hibernate state. The power-saving parameters further include parameter values which designate power-on/off of predetermined I/O devices in the computer 10, such as the sound controller 106, speakers 18A and 18B, ODD 20, Bluetooth module 108, wired LAN controller 114, wireless LAN controller 115, SD card controller for controlling communication with an SD card inserted in the SD card slot 22, and USB controller for controlling communication with a device connected to the USB port 23.

The power-saving function setting module 305 determines values suited to the usage pattern of the computer 10 and having a high power-saving effect as recommended values of power-saving parameters, based on the usage pattern of the computer 10 by the user, that is, based on the statistic information of the log information 310A.

For example, if the usage rate of a process which has a high load on the CPU 101 is a threshold value or more in a predetermined time period, the power-saving function setting module 305 determines and sets the recommended value of the clock number of the CPU 101 at a high value. For example, if there occurs no operation by the user during a predetermined time period and the number of times of occurrence of the state in which display on the LCD 17 continues for 10 minutes or more is a threshold value of more, the power-saving function setting module 305 determines and sets the recommended value of the time until power-off of the LCD 17 at 10 minutes. For example, if a mean measurement value of the illuminance sensor 21 is less than a threshold value during a predetermined time period, the power-saving function setting module 305 determines and sets the recommended value of the luminance of the LCD 17 at a low value. For example, if the number of times of access to the ODD 20 (e.g. the sum of the number of times of read and the number of times of write) during a predetermined time period is less than a threshold value, the power-saving function setting module 305 determines and sets the recommended value of the power-saving parameter indicative of the power-on/off of the ODD 20 at "OFF". Similarly, based on the usage pattern of the computer 10 by the user during a predetermined time period, that is, based on the statistic information of the log information 310A, the power-saving function setting module 305 determines and sets the recommended values of the power-saving parameters of the respective components (the respective devices) in the computer 10 at values suited to the usage pattern of the computer 10 by the user and having high power-saving effects. Specifically, the power-saving function setting module 305 can determine not only the recommended value of the power-saving parameter which designates power-on/power-off of the ODD 20, but also the recommended values of the power-saving parameters which designate power-on/power-off of other I/O devices, such as the SD card controller, USB controller, IEEE 1394 controller 113, wired LAN controller 114 and wireless LAN controller 115, based on the usage rates of these I/O devices. The recommended value of the power-saving parameter corresponding to an I/O device, whose usage rate is less than a threshold value, is determined at a value which designates power-off of this I/O device. Depending on the usage pattern of the computer 10 by the user, the usage rates of plural I/O devices in the computer 10 vary respectively. In the present embodiment, the recommended value of the power-saving parameter corresponding to an I/O device, whose usage rate is a threshold value or more, can be kept at a value indicative of power-on. On the other hand, the recommended value of the power-saving parameter corresponding to an I/O device, whose usage rate is less than a threshold value, can automatically be changed from power-on to power-off. Therefore, the useless power consumption by an I/O device, which is hardly used, can be reduced.

The above-described "predetermined time period" is, for instance, a day unit period, a month unit period, or a year unit period. Thus, for example, based on log information collected in January, 2009, the recommended value of the power-saving parameter used in February, 2009 is determined. In addition, for example, based on log information collected in January through March, 2009, the recommended value of the power-saving parameter used in April through June, 2009 is determined. In this manner, the recommended value of the power-saving parameter is newly determined according to collected log information in every predetermined time period.

The power-saving function setting module 305 displays the determined recommended value of the power-saving parameter, for example, on the LCD 17. The user refers to, e.g. the statistic information of the log information 310A displayed by the log information presenting module 304, confirms the displayed recommended value of the power-saving parameter, and varies the value as needed. The power-saving function setting module 305 sets the value confirmed or varied by the user as the power-saving parameter. In the meantime, without confirmation or change by the user, the power-saving function setting module 305 may automatically set the determined recommended value of the power-saving parameter as the value of the power-saving parameter. Besides, the process of determining the recommended value of the power-saving parameter may be executed, not only in every predetermined time period, but also at the request by the user.

The power-saving processing module 306 controls the respective components in the computer 10 according to the values of power-saving parameters set by the power-saving function setting module 305. Specifically, for example, if the time until power-off of the LCD 17 which is a power-saving parameter is set at 10 minutes, the power-saving processing module 306 powers off the LCD 17 when display on the LCD 17 is continued for 10 minutes without an operation by the user. In addition, for example, if the power-saving parameter indicative of power-on/off of the ODD 20 is set at "OFF", the power-saving processing module 306 powers off the ODD 20.

If powering off the I/O device in the computer 10, such as the ODD 20, the power-saving processing module 306 may completely shut off power to the I/O device, or may keep power supply to a bus connection part of the I/O device and shut off power supply to the other parts of the I/O device. The connection between the I/O device and the bus can be maintained by keeping power supply to the bus connection part of the I/O device, and the power supplied to the I/O device can be reduced by shutting off power supply to the other parts of the I/O device.

In addition to the control to power on/off the I/O device in the computer 10, the power-saving processing module 306 executes control to power on/off removable devices (external devices) such as an IEEE 1394 device connected to the IEEE 1394 controller 113 and a USE device connected to the USB port 23, that is, control to supply power to the removable devices. If the power-saving parameter indicative of power-on/off of a removable device is set at "OFF", the power-saving processing module 306 shuts off power supply to the removable device. Thereby, the power supplied to the removable device can be reduced.

If powering on/off the I/O device or removable device, the power-saving processing module 306 may directly execute the control to power on/off the device, as described above, or may send a control signal for powering on/off the device to the BIOS. In the latter case, the BIOS which has received the control signal from the power-saving processing module 306 controls the power supplied to the device, via the EC/KBC 116 or power supply circuit 24. For example, if the power-saving parameter indicative of power-on/off of ODD 20 is set at "OFF", the power-saving processing module 306 sends the control signal for powering on/off the ODD 20 to the BIOS. The BIOS sends the control signal for shutting off the power supply to the ODD 20 to the EC/KBC 116. According to the control signal sent from the BIOS, the EC/KBC 116 cooperates with the power supply circuit 24 and shuts off the power supply to the ODD 20.

The power-saving setting application program 202 is realizable as a resident program which starts in response to the boot of the OS 201 and terminates in response to the shutdown of the OS 201. The power-saving setting application program 202 can monitor the usage pattern of the computer 10 by the user during the period in which the OS 201 is running (i.e. the period in which the computer 10 is powered on), and can determine recommended values of power-saving parameters suited to the usage pattern and having high power-saving effects. Besides, in the power-saving setting application program 202, only the monitoring module 302 which monitors the usage pattern of the computer 10 by the user may be configured as a resident program, and the log analysis module 303, log information presenting module 304, power-saving function setting module 305 and power-saving processing module 306, which relate to the setting of power-saving parameters, etc., may be configured as programs executed in every predetermined time period or executed only at the request by the user.

Figure 5:
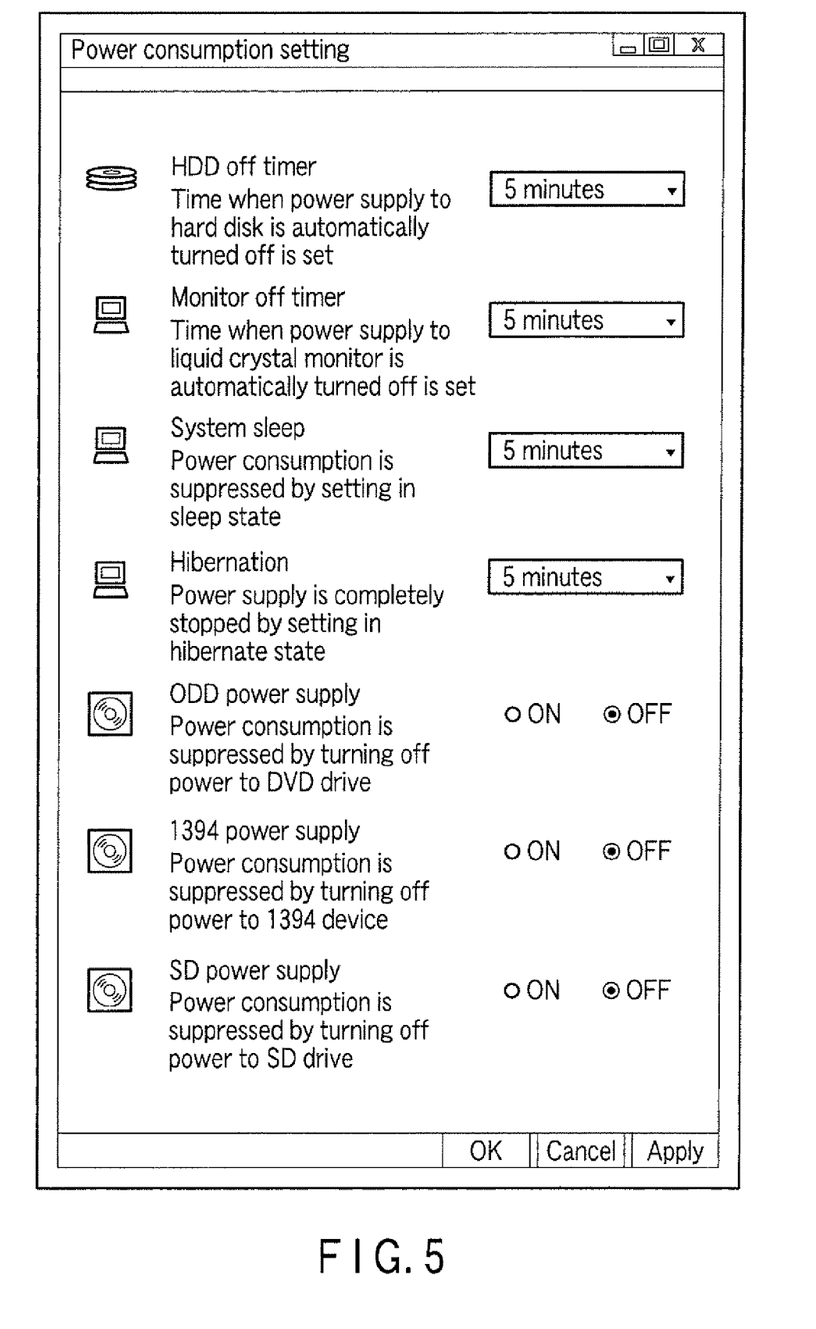
FIG. 5 shows an example of a power-saving setting screen displayed by the power-saving setting application shown in FIG. 3.

FIG. 5 shows an example of a power-saving setting screen displayed by the power-saving setting application 202.

The power-saving setting screen displays the time until power-off of the HDD 109; the time until power-off of the LCD 17; the time until setting the system in a sleep mode; the time until setting the computer 10 in a hibernate state; and values indicative of power-on/off of some predetermined I/O devices (e.g. ODD 20, IEEE 1394 device and SD card), as power-saving parameters. Lists for selecting time are displayed in connection with the power-saving parameters indicative of the time until power-off of the HDD 109, the time until power-off of the LCD 17, the time until setting the system in a sleep mode, and the time until setting the computer 10 in a hibernate state. Buttons (radio buttons) for selecting power-on/off are displayed in connection with the power-saving parameters indicative of power-on/off of the ODD 20, power-on/off of the IEEE 1394 device and power-on/off of the SD card. The lists for selecting time displays recommended values determined by the power-saving function setting module 305. The buttons for selecting power-on or power-off are displayed in the state in which one of buttons ("ON" and "OFF"), which corresponds to the recommended value determined by the power-saving function setting module 305, is selected.

The user can confirm or vary the power-saving parameters on the power-saving setting screen. As each power-saving parameter, a recommended value with a high power-saving effect is displayed based on the usage pattern of the computer 10 by the user. Thus, the user can set proper power-saving parameters simply by performing an operation of determining the value displayed as the recommended value as the power-saving parameter, without the user himself/herself considering the effect of the power-saving setting. In other words, even a user having no detailed knowledge about the power-saving setting, can easily set proper power-saving parameters. In addition, even if the method of use (life style) of the computer 10 by the user has changed after the values are set for the power-saving parameters, recommended values of the power-saving parameters corresponding to the change of the method of use can be presented to the user based on the stored log information 310A.

The values determined on the power-saving setting screen are set as the power-saving parameters. The respective components in the computer 10 are controlled based on the values set as the power-saving parameters.

In the meantime, it is possible to display the statistic information of the log information 310A by the log information presenting module 304, together with the above-described power-saving setting screen. In this case, the user can determine the values of the power-saving parameters by referring to the statistic information of the log information 310A.

Figure 6:
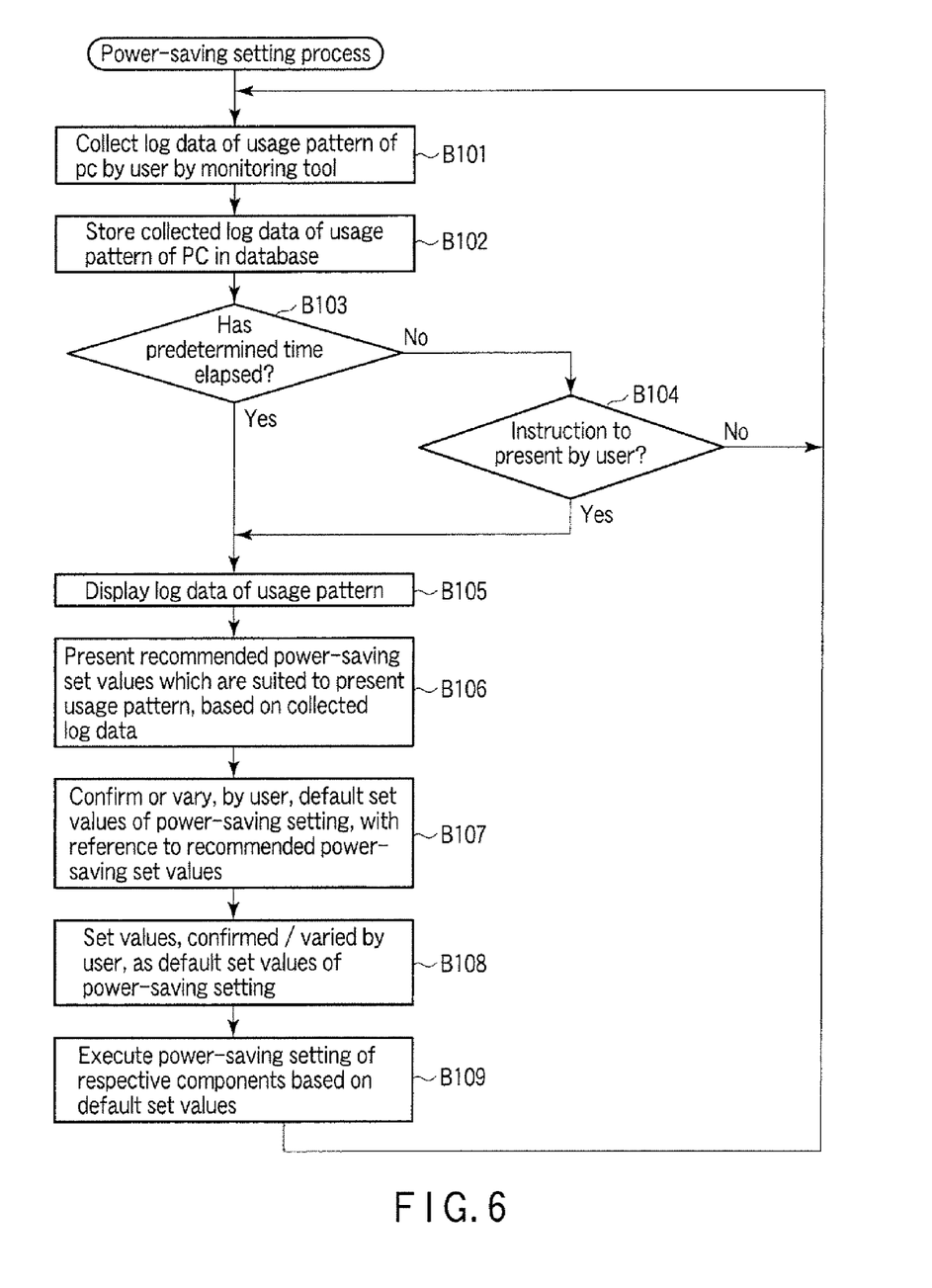
FIG. 6 is an exemplary flowchart illustrating an example of the procedure of a power-saving setting process executed by the information processing apparatus of the embodiment.

Next, referring to a flowchart of FIG. 6, a description is given of an example of the procedure of the power-saving setting process executed by the computer 10.

To start with, the power-saving setting application 202 monitors the usage pattern of the computer 10 by the user, and collects information indicative of the usage pattern of the computer 10 (block B101). The power-saving setting application 202 stores the collected information as log information 310A into the database 310 (block B102).

Then, the power-saving setting application 202 determines whether a predetermined period has passed since recommended values of power-saving parameters were previously determined (block B103). In other words, the power-saving setting application 202 determines whether the log information 310A during a predetermined period has been collected.

If a predetermined period has not passed since recommended values of power-saving parameters were previously determined (NO in block B103), the power-saving setting application 202 determines whether a request for displaying recommended values of power-saving parameters has been received from the user (block B104).

If a predetermined period has passed since recommended values of power-saving parameters were previously determined (YES in block B103) or if a request for displaying recommended values of power-saving parameters has been received from the user (YES in block B104), the power-saving setting application 202 reads out the log information 310A from the database 310 and displays the log information 310A on the LCD 17 (block B105). The information to be displayed may be statistic information of the log information 310A, or may be a table or graph showing such information. Based on the log information 310A, the power-saving setting application 202 determines recommended values of power-saving parameters, which are suited to the usage pattern of the computer 10 by the user, and displays the recommended values on the LCD 17 (block B106). The power-saving setting application 202 calculates statistic information of the log information 310A, and determines the power consumptions of the respective components in the computer 10, the heat control conditions of the respective components in the computer 10; the processing speed of the CPU 101; the amount of use of the main memory 103; the luminance of the LCD 17; the turn-on time of the backlight; the time until power-off of the LCD 17; the time until power-off of the HDD 109; the time until power-off of the ODD 20; the time until setting the system in a sleep mode; and the time until setting the computer 10 in a hibernate state, based on the calculated statistic information. In addition, based on the calculated statistic information of the log information 310A, the power-saving setting application 202 determines recommended values which indicate power-on/off of the respective devices in the computer 10, such as the speakers 18A and 180 and ODD 20.

The user confirms or varies the recommended values of power-saving parameters displayed on the LCD 17 by the power-saving setting application 202, and determines default set values set for the power-saving parameters (block B107). At this time, the user can determine the default set values set for the power-saving parameters, by referring to the displayed log information 310A, the statistic information of the log information 310A, and a table or graph showing such information items.

The power-saving setting application 202 sets the values determined by the user as the default set values of power-saving parameters (block B108). Based on the default set values of power-saving parameters, the power-saving setting application 202 controls the respective components in the computer 10 and executes power-saving setting of each component (block B109). Specifically, according to the default set values of the power-saving parameters, for example, the time until power-off of each component (each device) in the computer 10, the time until setting the system in the sleep state and the time until setting the computer 10 in the hibernate state are set. In addition, according to the default set values of the power-saving parameters, the respective components (I/O devices) in the computer 10 are powered on/off.

By the above-described process, the power saving of the respective components in the computer 10 is executed based on the usage pattern of the computer 10 by the user. The computer 10 monitors the usage pattern of the computer 10 by the user, and collects the log information 310A indicative of the usage pattern. Based on the collected log information 310A, the computer 10 determines recommended (proper) values of power-saving parameters. The user confirms or varies the determined recommended values of power-saving parameters, and determines values set for the power-saving parameters. The computer 10 sets the determined values for the power-saving parameters, and controls the respective components in the computer 10 based on the set values.

Figure 7:
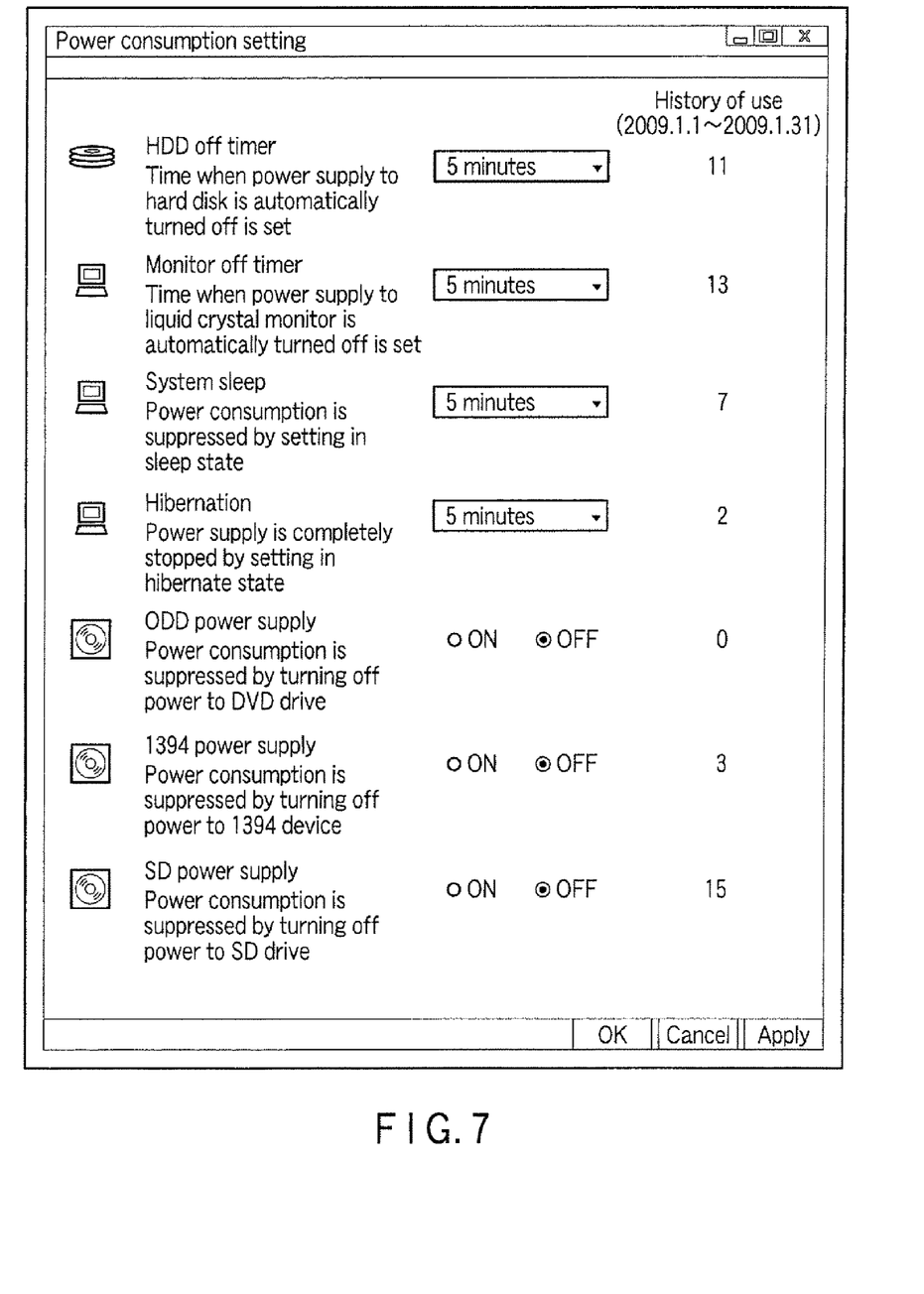
FIG. 7 shows another example of the power-saving setting screen displayed by the power-saving setting application shown in FIG. 3.

FIG. 7 shows another example of the power-saving setting screen displayed by the power-saving setting application 202.

The power-saving setting screen displays the log information 310A indicative of the usage pattern by the user, and the statistic information of the log information 310A, in addition to the information for confirming and varying the recommended values of power-saving parameters. For example, as regards the power-saving parameter indicative of power-on/off of the ODD 20, the information indicative of the number of times of use of the ODD 20 during a predetermined period is displayed in addition to the buttons for selecting power-on/off. The buttons for selecting power-on/off are displayed in the state in which either of buttons ("ON" and "OFF"), which corresponds to the recommended value determined by the power-saving function setting module 305, is selected.

The user can determine the value set for the power-saving parameter by confirming or varying the power-saving parameter with reference to the log information such as the number of times of use of each device during a predetermined period. The user recognizes that the number of times of use of the ODD 20 during the latest predetermined period is 0, that is, that the ODD 20 is not used during the latest predetermined period, on the power-saving setting screen. Then, the user confirms that the recommended value of the power-saving parameter indicative of power-on/off of the ODD 20 is "OFF". If the user thinks that the ODD 20 will not be used hereafter, the power-saving parameter of the ODD 20 is set to remain "OFF". On the other hand, if the user thinks that the ODD 20 will be used hereafter, the user performs an operation of changing the power-saving parameter of the ODD 20 from "OFF" to "ON". Then, the user determines the power-saving parameter, for example, by performing an operation of pressing an OK button provided on the power-saving setting screen. Based on the power-saving parameter determined as described above, control to reduce power consumption of each component in the computer 10 is executed.

The log information 310A, which indicates the usage pattern by the user, and the statistic information of the log information 310A may be displayed, as described above, not merely by numerical values, but also by a table or graph.

As has been described above, according to the present embodiment, the recommended values of power-saving parameters for controlling the power-saving function of the computer 10 are determined in accordance with the usage pattern of the computer 10. Thus, the power-saving setting suited to the usage pattern of the computer 10 by the user can be presented to the user. The computer 10 monitors the usage pattern of the computer 10 by the user, and stores log information indicative of the usage pattern. Based on the stored log information, the computer 10 determines recommended values of power-saving parameters suited to the usage pattern of the computer 10 by the user and having high power-saving effects. The user determines the values set for the power-saving parameters, by confirming or varying the determined recommended values of power-saving parameters. The computer 10 sets the determined values as the power-saving parameters, and controls the respective components in the computer 10 based on the set values.

The recommended values of the power-saving parameters are presented to the user in every predetermined time period or at the request by the user. It is possible to provide an automatic setting function for automatically setting the recommended values of power-saving parameters determined by the computer 10, as the default values of power-saving parameters. Thereby, the user can set proper power-saving parameters simply by performing an operation of determining the value displayed as the recommended value, for the power-saving parameter, without the user himself/herself considering the effect of the power-saving setting. In other words, even a user who has no detailed knowledge about the power-saving setting can easily set proper power-saving parameters. In addition, even if the method of use (life style) of the computer 10 by the user has changed after the values are set for the power-saving parameters, recommended values of the power-saving parameters corresponding to the change of the method of use can be presented to the user based on the stored log information 310A.

The power-saving setting process of the present embodiment is not limited to the power-saving parameters exemplified in the above description of the embodiment, but is applicable to any of the elements which vary the power consumption of the computer 10. Thus, the computer 10 monitors and collects any information indicative of the usage pattern of the computer 10 by the user, which relates to power-saving parameters.

The various modules of the systems described herein can be implemented as software applications, hardware and/or software modules, or components on one or more computers, such as servers. While the various modules are illustrated separately, they may share some or all of the same underlying logic or code.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An information processing apparatus comprising a power-saving function, the apparatus comprising:
   a monitoring module configured to monitor a usage pattern of the information processing apparatus, and to store log information indicative of the usage pattern in a storage device; and
   a power-saving setting presenting module configured to determine recommended values of power-saving parameters for specifying content of the power-saving function with respect to each power-saving processing, based on the stored log information, and to display the determined recommended values,
   wherein the power-saving setting presenting module is further configured to determine, if a predetermined time period has passed since the recommended values were determined, new recommended values of the power-saving parameters based on log information stored during the predetermined time period, the new recommended values being used in a time period subsequent to the predetermined time period, and configured to display the new recommended values.

2. The information processing apparatus of claim 1, wherein the power-saving parameters include a first parameter for designating power-on or power-off of a predetermined device in the information processing apparatus,
   the log information includes information indicative of a usage rate of the predetermined device, and
   the power-saving setting presenting module is configured to determine that the recommended value of the first parameter is a value which designates the power-off of the predetermined device, if the usage rate of the predetermined device is less than a threshold value.

3. The information processing apparatus of claim 2, wherein the information processing apparatus includes a processor and I/O devices, and
   the predetermined device is a predetermined I/O device in the I/O devices.

4. The information processing apparatus of claim 1, wherein the power-saving setting presenting module is configured to set the determined recommended values for the power-saving parameters.

5. The information processing apparatus of claim 1, further comprising a log information presenting module configured to display content of the stored log information.

6. The information processing apparatus of claim 1, wherein the log information includes information indicative of a power consumption of the information processing apparatus, a usage rate indicative of a usage pattern of each of modules in the information processing apparatus, a usage rate indicative of a usage pattern of each of devices in the information processing apparatus, and information indicative of an environment of use of the information processing apparatus.

7. A power-saving setting method of setting a power-saving function of an information processing apparatus, comprising:
   monitoring a usage pattern of the information processing apparatus and storing log information indicative of the usage pattern in a storage device; and
   determining recommended values of power-saving parameters for specifying content of the power-saving function with respect to each power-saving processing, based on the stored log information, and displaying the determined recommended values, wherein the determining further comprises determining, if a predetermined time period has passed since the recommended values were determined, new recommended values of the power-saving parameters based on log information stored during the predetermined time period, the new recommended values being used in a time period subsequent to the predetermined time period, and displaying the new recommended values.

8. A non-transitory computer readable storage medium having a program stored thereon that is executable by a computer to control the computer to execute functions of:

monitoring a usage pattern of the computer, and storing log information indicative of the usage pattern in a storage device; and determining recommended values of power-saving parameters for specifying content of a power-saving function of the computer with respect to each power-saving processing, based on the stored log information, and executing a power-saving setting presenting process for displaying the determined recommended values, wherein the determining further comprises determining, if a predetermined time period has passed since the recommended values were determined, new recommended values of the power-saving parameters based on log information stored during the predetermined time period, the new recommended values being used in a time period subsequent to the predetermined time period, and displaying the new recommended values.

* * * * *